United States Patent [19]
Deynet

[11] Patent Number: 5,668,422
[45] Date of Patent: Sep. 16, 1997

[54] SEALED CONNECTING DEVICE BETWEEN TWO HOUSING END FACES

[75] Inventor: Rolf Deynet, Würzburg, Germany

[73] Assignee: Siemens Aktiengessellschaft, München, Germany

[21] Appl. No.: 569,434

[22] Filed: Dec. 8, 1995

[30] Foreign Application Priority Data

Dec. 9, 1994 [EP] European Pat. Off. ............. 94119545

[51] Int. Cl.$^6$ ..................................................... H02K 11/00
[52] U.S. Cl. ..................... 310/71; 310/239; 310/88; 310/43
[58] Field of Search ............................. 310/71, 88, 239, 310/43, 58; 277/205, 206 R, 207 R; 49/490.1; 417/423.11

[56] References Cited

U.S. PATENT DOCUMENTS

| | | | |
|---|---|---|---|
| 3,731,126 | 5/1973 | Hagenlocher et al. | 310/68 |
| 4,709,180 | 11/1987 | Denk | 310/179 |
| 4,713,568 | 12/1987 | Adam et al. | 310/112 |
| 5,291,088 | 3/1994 | Adam et al. | 310/88 |

FOREIGN PATENT DOCUMENTS

| | | |
|---|---|---|
| 2109791 | 5/1972 | France . |
| 3823404 | 1/1990 | Germany . |
| 9107992 | 1/1992 | Germany . |
| 4235962 | 5/1994 | Germany . |
| 0512850 | 10/1971 | Switzerland . |

Primary Examiner—Thomas M. Dougherty
Assistant Examiner—B. Mullins
Attorney, Agent, or Firm—Kenyon & Kenyon

[57] ABSTRACT

A sealed connecting device for sealing a motor-pump aggregate includes a brush-holder plate disposed in the sealing plane between the motor housing and the pump housing. A U-shaped sealing ring member is stretched over the outer rim of the brush-holder plate. Connecting leads, which lead to the outside, are embedded free of compression in the brush-holder plate in the sealing fit area and are inserted radially outside of the fit area through sealingly abutting sealing tubes pre-molded on the sealing ring member.

23 Claims, 4 Drawing Sheets

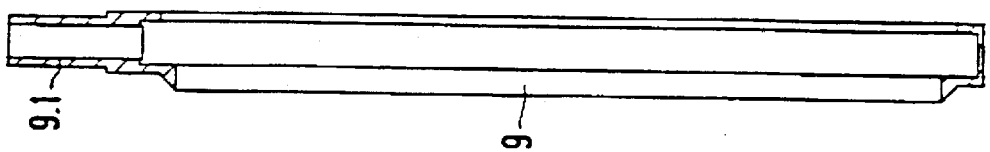
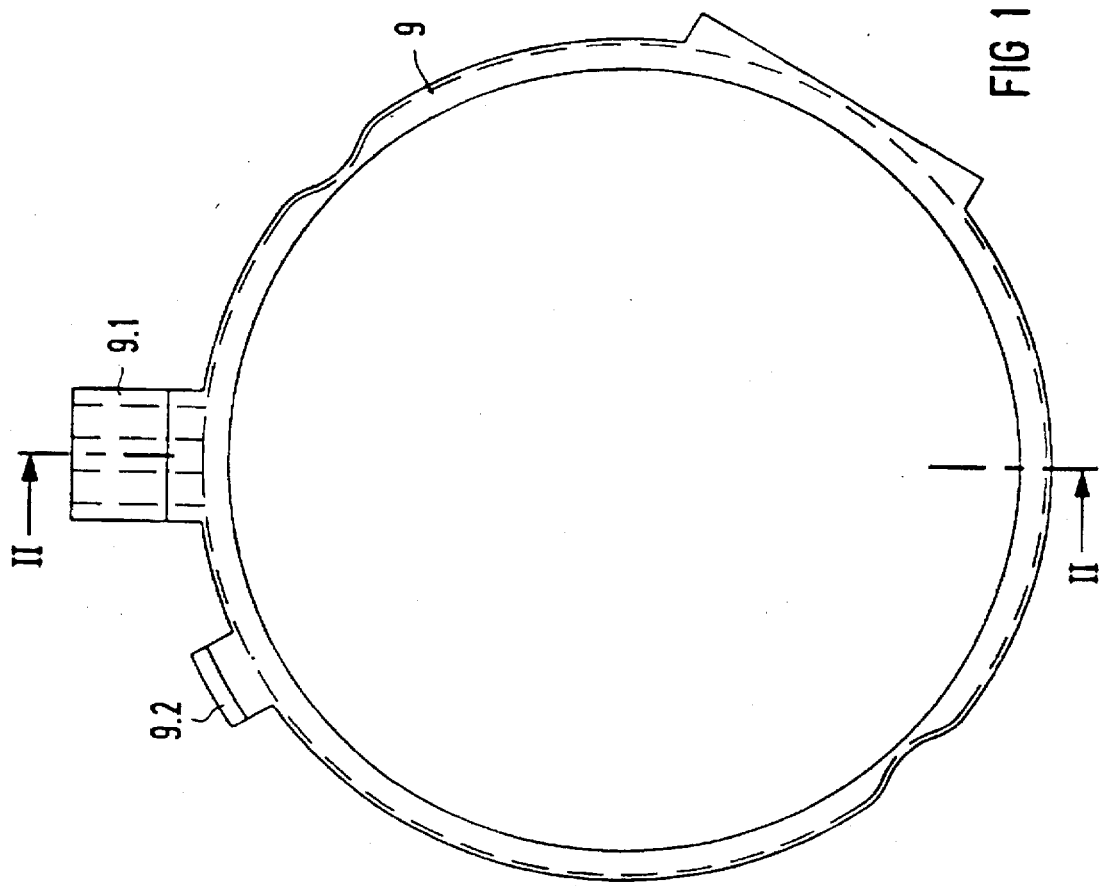

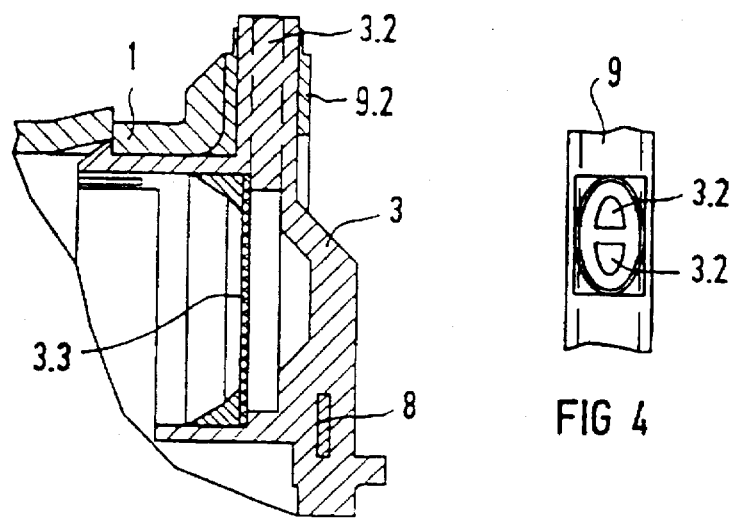
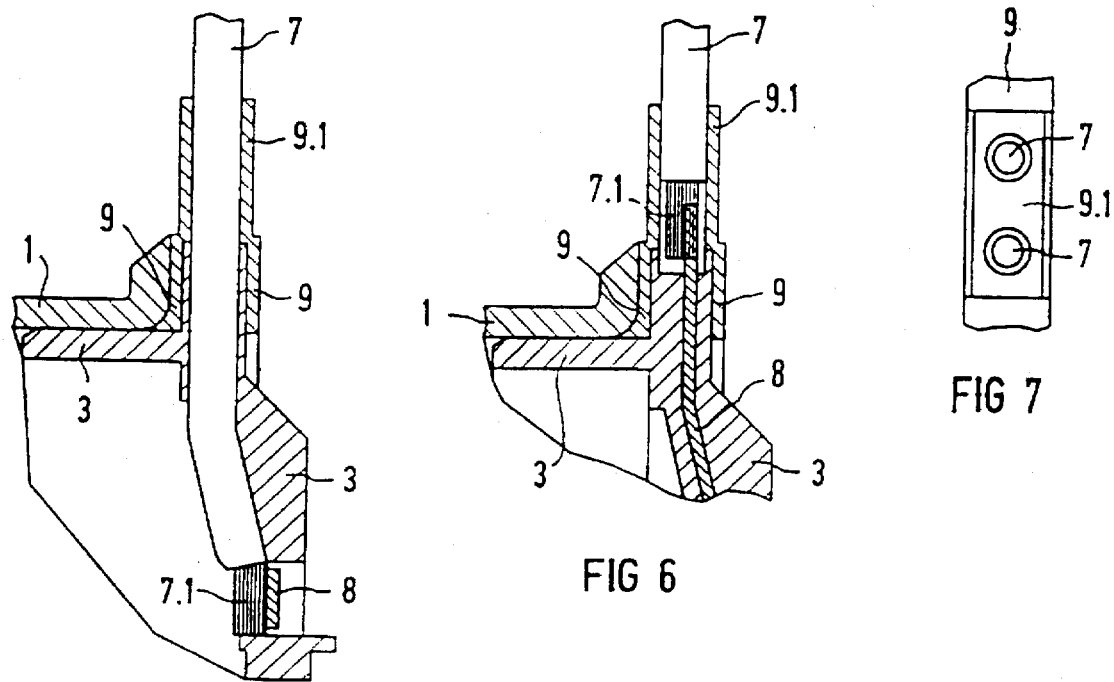

SEALED CONNECTING DEVICE BETWEEN TWO HOUSING END FACES

BACKGROUND OF THE INVENTION

The invention relates to a sealed connecting device between two housing end faces and, in particular, to a sealed connecting device between a motor housing and a pump housing.

The German Laid Open Print A1-42 35 962 discloses a hydraulic pump having a damp-proof, front-side seating between the pot-shaped rim of a pot-shaped motor housing of a commutator motor and a pump housing. For sealing purposes, a plastic brush-holder plate is disposed in the sealing plane, fitting with sealing lips pre-molded in one piece against the end face of the housing or rather against the pot-shaped rim of the motor housing.

It has also already been proposed (European Patent Application 94 107 424.7) for a similar motor-pump assembly, to provide the plastic brush-holder plate, which extends with its outer edge between the housing end faces being connected, with extruded-on sealing surfaces in its front area, where it contacts the rim of the motor housing or where it fits against the end face of the pump housing.

The present invention provides a sealed connecting device disposed between two housing end faces and includes a plate-shaped adapter, in particular a plastic brush-holder plate in the plane of the housing end faces, which can be simply produced and assembled for an inexpensive series application and, nevertheless, will provide a complete immersion seal-tightness, particularly for external connecting leads which pass through in the vicinity of the connecting device.

SUMMARY OF THE INVENTION

The present invention solves the above problems by providing the connecting device of the present invention in which the seals can be manufactured by injection-molding and vulcanization independently, in terms of location and time, of the adapter that will later support them, as well as without having to allow for the otherwise necessary high heat resistance of the adapter. And, from the standpoint of assembly and production engineering, the connecting device allows the connecting leads to be sealingly inserted through the sealing tubes pre-molded on the sealing ring member, before the sealing ring member is fit on to the adapter. This is accomplished in such a way that when the connecting leads are led through in the area of the sealing surfaces that are pressed on by the housing end faces, there is no influence on the compression characteristics of these sealing surfaces, so that a uniform sealing action is maintained over the entire sealing surface.

The connecting leads consist, at least in the area of the sealing-type fitting of the sealing tubes, of insulating, elastic cable lines, which in accordance with another refinement of the invention, are connected by an inner stripped end to contact lines of the adapter, which is designed as a brush-holder plate of a commutator motor.

In the case of one connecting device, in particular, between a motor housing and a pump housing, according to one refinement of the invention, the adapter is provided with an embedded vent duct leading from inside the motor housing to the outside, which, in the same way as the connecting leads, is inserted radially outside of the sealing contact-making area of the housing end faces through a sealing tube that sealingly abuts on said duct and is pre-molded on the sealing ring member, in such a way that a uniform sealing fit between the adapter and the motor housing or pump housing abutting axially on the front end can be obtained in the area of the vent duct, as well.

According to one refinement of the invention, to provide the sealed-off connection, the adapter is used as a suitable bearing part for the sealing ring member that is mountable on its outer edge and as a brush-holder plate when a commutator motor to be connected to a second housing is used. In addition, the adapter is used for aligning and for the shaft-side sealing of the commutator motor when it is connected at its end face to the other housing, in particular to a pump housing, in that the rotor shaft end of the motor is concentrically supported on the commutator side over a rotor shaft bearing, which is tightly fit on, directly in a bearing receptacle of the other housing, and in that the brush-holder plate fixed in position opposite the motor housing radially abuts sealingly on the rotor shaft end of the motor.

BRIEF DESCRIPTION OF THE DRAWINGS

FIG. 1 is a top view of a sealing ring member according to an embodiment of the present invention;

FIG. 2 is a section view through II—II of the sealing ring member in accordance with FIG. 1;

FIG. 3 is a partial cut-away view of an embodiment of the connecting device in the area of the vent duct emerging through the sealing plane;

FIG. 4 is a top view of the emerging vent duct;

FIG. 5 is a partial cut-away view of an embodiment for connecting leads brought out in the area of the sealing fit;

FIG. 6 is a partial cut-away view for another embodiment for connecting leads brought out in the area of the sealing fit;

FIG. 7 is a top view of the connecting leads brought out in accordance with FIGS. 5 and 6;

DETAILED DESCRIPTION

Figure 10:
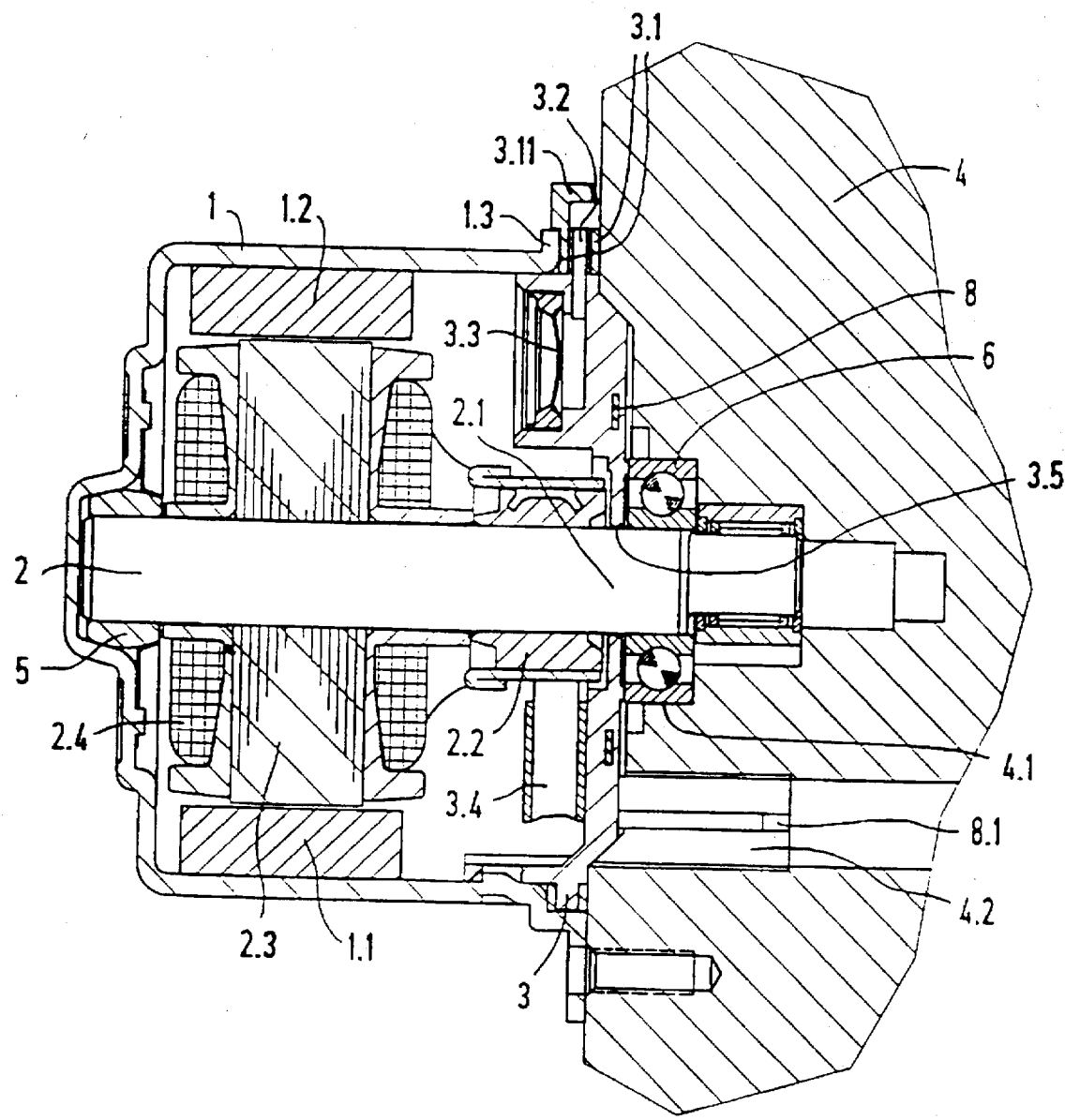
FIG. 10 is a cross-sectional view of a motor-pump aggregate with an embodiment of a sealing connecting device between the motor housing and pump housing with sealing coatings sprayed on the adapter.

FIG. 10 depicts an axial, partial longitudinal section of a motor-pump aggregate with a pot-shaped motor housing 1 of a commutator motor, which abuts with its pot-shaped rim 1.3 on the front end sealingly against a pump housing 4 and is able to be screw-coupled, for example, to said pump housing. For purposes of magnetic excitation, exciter magnets 1.1 and 1.2 are secured to the inner circumference of the motor housing 1. As an adapter, a brush-holder plate 3 is fixed in position against the pot-shaped rim 1.3 of the motor housing 1, said brush-holder plate being provided at least on the rim side on both front ends with a preferably elastic sealing coating 3.1 in such a way that when the motor housing 1 is screwed onto the end face of the pump housing 4, both components are imperviously sealed off from one another. The brush-holder plate 3 is preferably plastic-extruded, with an essentially plate-shaped design. In accordance with known methods, this sealing coating 3.1 is typically extruded on to the adapter in the form of the brush-holder plate 3. Although a sealing arrangement of this type does produce a high immersion seal-tightness, this manufacturing operation also requires a high heat resistance for the adapter and entails long holding times for the entire adapter.

The rotor shaft 2 accommodating a commutator 2.2, as well as a rotor laminated core 2.3 with a rotor winding 2.4, is supported at its left end in a cup-shaped bearing provided as a B-side rotor shaft bearing 5 and, at its right end, in a ball bearing provided as an A-side rotor shaft bearing 6. The A-side rotor shaft bearing 6 mounted in a force fit on the right rotor shaft end 2.1 of the rotor shaft 2 is accommodated, radially centered directly in a bearing seat 4.1 of the pump housing 4 and is braced in the direction of the B-side axially against the brush-holder plate 3, by fitting against it with its outer bearing ring.

Figure 8:
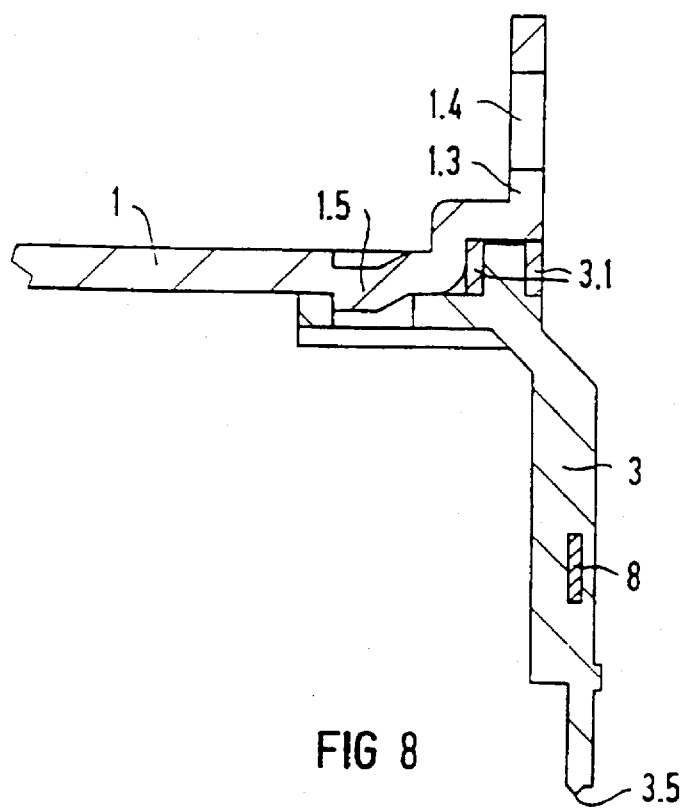
FIG. 8 is a cross-sectional view of a portion of a sealed connecting device with sealing coatings sprayed on to the adapter.

The commutator motor is advantageously designed as a constructional unit, which is capable of being preassembled and has a brush-holder plate 3 that is axially secured to the open motor housing side, in particular, as is apparent from FIG. 8, locked in place by means of detention means 1.5 distributed over the circumference and that is provided with sealing coatings 3.1. The constructional unit is axially inserted into the bearing seat 4.1 of the pump housing 4 concentrically to said pump housing 4 with the A-side rotor shaft bearing 6 that is tightly fit on the rotor shaft end 2.1 axially on the outside, in front of the brush-holder plate 3.

The preassembled motor constructional unit is directly braced radially and sealingly via its brush holder 3 against the A-side rotor shaft bearing 6 and, thus, against the bearing seat 4.1 of the pump housing 4 and overall, therefore, given an axial plug-in assembly between the motor housing 1, on the one hand, and the pump housing 4, on the other hand, can be concentrically aligned in front of the final, reciprocal flanging. In the exemplary embodiment illustrated in FIG. 10, the direct centering with respect to the pump housing 4 takes place via the brush-holder plate 3 and the rotor shaft 2, against which the brush-holder plate 3 fits concentrically and sealingly with a blade-shaped contact rim 3.5. A negligible frictional resistance and a good sealing action are achieved by means of the blade-shaped contact rim 3.5, so that any leakage from the pump cannot get into the inside of the motor housing 1.

The reciprocal connectors between the components or contacts to be accommodated by the brush-holder plate 3 are designed in the form of a pressed screen 8 integrally cast in the brush-holder plate 3 in such a way that, at the sealing contact rims between the motor housing 1 and the pump housing 4, the pressed-screen connections are embedded, in particular injected, on both sides in the plastic base of the brush holder 3. As is shown in FIG. 10, to connect connecting leads, in particular control leads, to connectors of the brush-holder plate 3, an axially projecting plug contact 8.1 is pre-molded on the pressed screen 8. The plug contact 8.1 projects axially out of the brush-holder plate 3 and extends into a preferably axially running contact opening 4.2 in the pump housing 4 to allow a mating contacting of a control unit (not shown) that abuts on the front end on the side of the pump housing 4 turned away from the motor.

Figure 9:
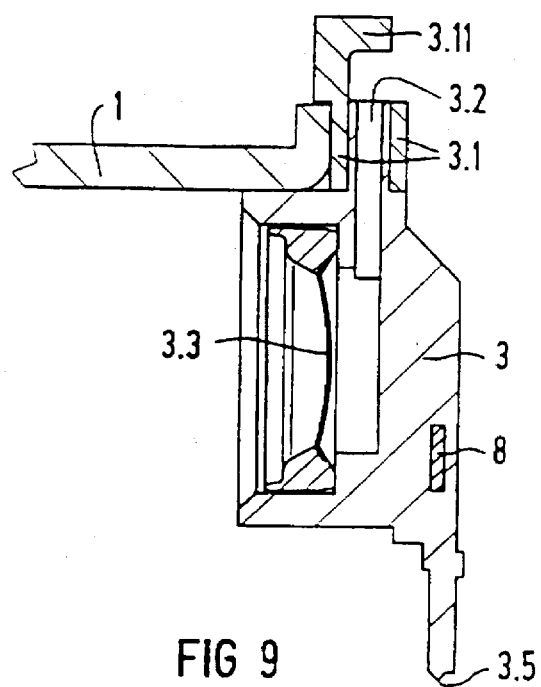
FIG. 9 is a cross-sectional view of a portion a vent duct in the area of the sealing fit with sprayed-on sealing coatings.

As shown in FIG. 9, the brush-holder plate 3 situated sealingly between the parts of the motor housing 1 that lie one in front of the other and of the pump housing 4, is provided with a vent duct 3.2 leading from inside the motor housing 1 to the outside. The vent duct 3.2 is integrally cast in the brush-holder plate 3, preferably running radially. To protect against a direct external ingress of moisture into this vent duct 3.2, a top part 3.11, which covers the outlet orifice of the vent duct 3.2 to the open axial and radial motor side, is pre-molded in one piece on the sealing coating 3.1 applied on the rim side on the brush-holder plate 3. To further protect against an ingress of moisture into the inside of the motor housing 1, the radial inner end of the vent duct 3.2 is sealed to the inside of the motor housing 1 by a membrane seal 3.3, which permits a venting of the inside of the motor housing 1 to the outside, and also prevents an ingress of moisture from the outside to the inside of the motor housing 1.

FIGS. 1–7 illustrate examples of the device according to embodiments of the present invention comprising a sealing ring member 9, which is manufactured as a separate, individual component that is clamped over the outer rim of the adapter, in particular of the brush-holder plate 3. The sealing ring member 9 also serves at the same time for sealingly bringing out external connecting leads 7 or 8, in particular supply lines, in the area of the sealing plane.

The fundamental configuration and design of an adapter in the form of a brush-holder plate 3 is retained as shown in the illustrative embodiments according to FIGS. 8–10. This brush-holder plate 3, in turn, is clamped in securely with its outer surface sealingly between the one pot-shaped, rim-side end face of a motor housing 1 of a commutator motor and the end face of a pump housing 4. To seal off between the end faces lying axially in front of one another to be mutually sealed off, a sealing ring member 9 is used, as shown in greater detail in FIGS. 1 and 2. The sealing ring member 9 has an essentially U-shaped cross-section which is able to be clamped over the outer rim of the brush-holder plate 3, in particular after the external connecting leads 7 and 8 and, in some instances, a vent pipe 3.2 have previously been extended therethrough.

Sealing tubes 9.1 or 9.2 are pre-molded in one piece on the outer surface of the sealing ring member 9 so that, before the sealing ring member 9 is clamped across the outer surface of the brush-holder plate 3, external connecting leads 7 or the vent pipe 3.2 are able to be inserted through, fitting closely against the sealing tubes 9.1 or 9.2. The external connecting leads 7 are contacted with a radially inner stripped end 7.1 by leads of the brush-holder plate 3, e.g. by means of a soldered connection. The leads of the brush-holder plate 3 are designed as a pressed screen 8 that is integrally cast in the brush-holder plate 3. The contacting point can follow radially below or radially above, as shown in FIGS. 5 and 6 respectively, the sealing fit of the motor housing or of the pump housing 4, on the outer rim of the brush-holder plate 3. In either case, the external connecting lead 7 that is passed through to the inside or the inner lead of the pressed screen 8 that is brought out further to the outside is embedded in the brush-holder plate 3 in such a way that, in the area where the connecting leads are brought out, there is no change in tightness and, thus, no difference in the compression characteristics of the sealing ring member 9. Thus, a uniform tightness of the seal is obtained over the entire sealing edge.

From the above descriptions, it is apparent that the brush-holder plate not only serves for actually accommodating and contacting the means for supplying current to the commutator, but also for bringing out embedded connecting leads. In addition, the brush-holder plate enables a uniform sealing over its entire outer rim by means of the blade-shaped contact rims 3.5, against its rotor-shaft side inner rim, while simultaneously centering the basic motor unit, which is capable of being preassembled, in a bearing seat of the pump housing 4.

What is claimed is:

1. A sealed connecting device for connecting a motor housing to a pump housing, wherein the sealed connecting device is disposed between end faces of the motor housing and the pump housing, wherein the sealed connecting device comprises:

a plastic brush-holder plate;

a sealing ring member having in radial cross-section a U-shape mounted on the circumferential rim of the plastic brush-holder plate, wherein the U-shaped sealing ring member has pre-molded, radially aligned sealing tubes, the U-shaped sealing ring member being vulcanized rubber, wherein the plastic brush-holder plate having the mounted U-shaped sealing ring member is sealingly disposed between the end faces of the motor housing and the pump housing; and connecting leads sealingly passing through the radially aligned tubes, the connecting leads being embedded free of compression in the plastic brush holder in the area where the end faces of the motor housing and pump housing are connected.

2. The sealed connecting device according to claim 1, wherein the portions of the connecting leads lying within the sealing tubes are insulating, elastic cable lines.

3. The sealed connecting device according to claim 2, wherein the brush-holder plate further comprises a contact line, the contact line being an integrally cast pressed screen, and one end of each connecting lead is stripped and connected to the contact line in the brush-holder plate.

4. The sealed connecting device according to claim 1, further comprising:

a vent duct provided in the brush-holder plate, the vent duct leading from inside the motor housing to outside the motor housing, and the vent duct being sealingly inserted through a sealing tube.

5. The sealed connecting device according to claim 2, further comprising:

a vent duct provided in the brush-holder plate, the vent duct leading from inside the motor housing to outside the motor housing, and the vent duct being sealingly inserted through a sealing tube.

6. The sealed connecting device according to claim 3, further comprising:

a vent duct provided in the brush-holder plate, the vent duct leading from inside the motor housing to outside the motor housing, and the vent duct being sealingly inserted through a sealing tube.

7. The sealed connecting device according to claim 4, wherein the vent duct further comprises a membrane seal disposed opposite the inside of the motor housing.

8. A sealed connecting device comprising:

a pot-shaped motor housing having a pot-shaped rim and an end face;

a pump housing having an end face, a plastic brush-holder plate;

a sealing ring member having in radial cross-section a U-shape mounted on the circumferential rim of the plastic brush-holder plate, wherein the U-shaped sealing ring member has pre-molded, radially aligned sealing tubes, the U-shaped sealing ring member being vulcanized rubber, wherein the plastic brush-holder plate having the mounted U-shaped sealing ring member is sealingly disposed between the end faces of the motor housing and the pump housing;

connecting leads sealingly passing through the radially aligned tubes, the connecting leads being embedded free of compression in the plastic brush holder in the area where the end faces of the motor housing and pump housing are connected;

a motor disposed in the motor housing;

a rotor shaft connected to the motor, the rotor shaft having a first end and a second end, a bearing seat provided in the pump housing; and a rotor shaft bearing disposed in the bearing seat, wherein the first end of the rotor shaft is supported by the rotor shaft bearing which is tightly fit on the rotor shaft, the rotor shaft being concentrically disposed in the pump housing and the first end of the rotor shaft is axially braced against the brush-holder plate in the direction of the second end of the rotor shaft over the rotor shaft bearing that is tightly fit on the first end of the rotor shaft and wherein the brush-holder plate abuts on the first end of the rotor shaft of the motor without a friction-locking or form-locking connection with the rotor shaft bearing.

9. The sealed connecting device according to claim 8, further comprising:

a vent duct provided in the brush-holder plate, the vent duct leading from inside the motor housing to outside the motor housing, and the vent duct being sealingly inserted through a sealing tube, the vent duct having a membrane seal disposed opposite the inside of the motor housing; and wherein the portions of the connecting leads lying within the sealing tubes are insulating, elastic cable lines and the brush-holder plate further comprises a contact line, the contact line being an integrally cast pressed screen, and one end of each connecting lead is stripped and connected to the contact line in the brush-holder plate.

10. The sealed connecting device according to claim 8, wherein the brush-holder plate further comprises a blade-shaped contact rim which is radially supported and sealingly abuts against the outer circumference of the first end of the rotor shaft.

11. A sealed connecting device for connecting a motor housing to a pump housing, wherein the sealed connecting device is disposed between end faces of the motor housing and the pump housing, wherein the sealed connecting device comprises:

a brush-holder plate;

a sealing ring member having in radial cross-section a U-shape mounted on the circumferential rim of the brush-holder plate, wherein the U-shaped sealing ring member has pre-molded, radially aligned sealing tubes, wherein the brush-holder plate having the mounted U-shaped sealing ring member is sealingly disposed between the end faces of the motor housing and the pump housing; and connecting leads sealingly passing through the radially aligned tubes, the connecting leads being embedded free of compression in the brush holder in the area where the end faces of the motor housing and pump housing are connected.

12. A sealed connecting device adapted to be inserted between the end faces of two housings which are to be connected, comprising:

a plate-shaped adapter with a rim having a sealing contact-making area at its outside circumference;

a separate elastic seal mounted at said outside circumference of said plate-shaped adapter, extending over said rim;

connecting leads radially extending from inside said plate-shaped adaptor to the outside, embedded in said adapter, at least in the sealing contact-making area; and pre-molded sealing tubes formed on said elastic seal, said connecting leads inserted through said sealing tubes, in a sealing abutting manner, as they extend radially outside said sealing contact making area, whereby, said connecting device can be inserted between the two housing end faces, with said plate in the plane of the housing end faces and sealing contact made in said sealing contact-making area, with said connecting leads free of compression in said contact making area.

13. The sealed connecting device of claim 12, wherein said adapter is a plastic brush-holder plate.

14. The sealed connecting device of claim 13, wherein said elastic seal is a sealing ring member having in radial cross-section a U-shape.

15. The sealed connecting device of claim 12, wherein the portions of said connecting leads inserted through said sealing tubes are insulating, elastic cable lines.

16. The sealed connecting device of claim 15, wherein said adapter has contact lines formed thereon, and one end of each connecting lead is stripped and connected to the contact lines.

17. The sealed connecting device of claim 16, wherein said contact lines of said adapter are formed as an integrally cast pressed screen.

18. The sealed connecting device of claim 12, further comprising:

a vent duct formed in said adapter, said vent duct leading from one side of said plate to the outside, and a sealing tube premolded to said elastic seal, said vent duct being sealingly inserted through said sealing tube in the area radially outside said sealing contact-making area, whereby, when inserted between two housings, one of said housings can be vented to the outside.

19. The sealed connecting device of claim 18, and further including a membrane seal disposed at the inside opening of said vent duct, whereby when said device is inserted between the two housings, said membrane will prevent ingress of moisture to the one housing in communication with said duct.

20. The sealed connecting device of claim 19, in combination with a pump and a motor, wherein said two housing end faces include the end faces of a motor housing and a pump housing and said one housing is a motor housing.

21. The sealed connecting device of claim 18, in combination with a pump and a motor, wherein said two housing end faces include the end faces of a motor housing and a pump housing and said one housing is a motor housing.

22. The sealed connecting device of claim 19, in combination with a pump and a motor, wherein said two housing end faces include the end faces of a motor housing and a pump housing.

23. The sealed connecting device of claim 18, in combination with a pump and a motor, wherein said two housing end faces include the end faces of a motor housing and a pump housing.

* * * * *